A. O. M. LÖFGREN.
PORTABLE SAWING MECHANISM.
APPLICATION FILED DEC. 5, 1921.
Reissued Feb. 28, 1922. 15,294.
2 SHEETS—SHEET 1.
Fig. 1.
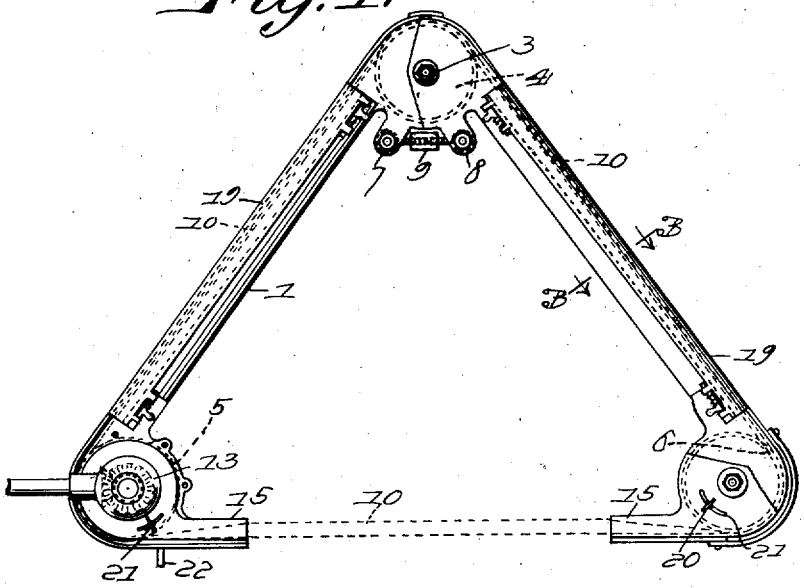
Fig. 2.
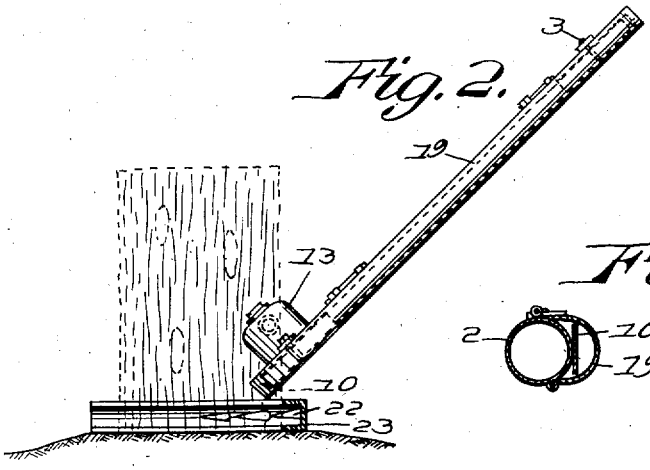
Fig. 3.
Inventor
A. O. M. Löfgren,
By Marks & Clerk
Attorney A. O. M. LÖFGREN.
PORTABLE SAWING MECHANISM.
APPLICATION FILED DEC. 5, 1921.
Reissued Feb. 28, 1922.
15,294.
2 SHEETS—SHEET 2.
Fig. 4.
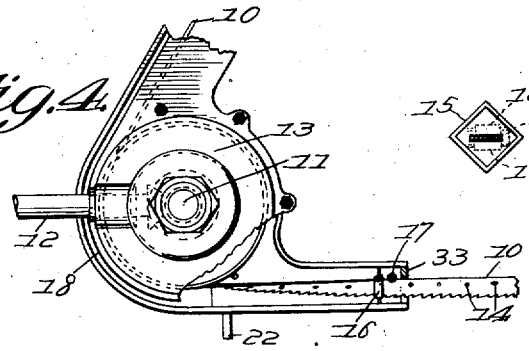
Fig. 6.
Fig. 5.
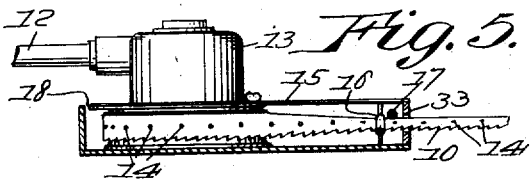
Fig. 7.
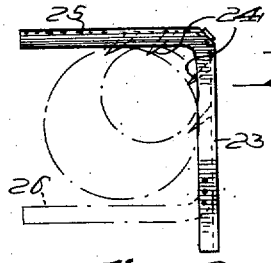
Fig. 8.
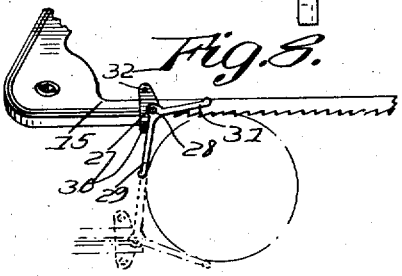
Fig. 9.
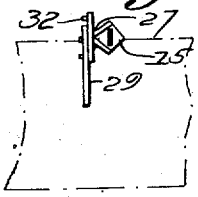
Fig. 10.
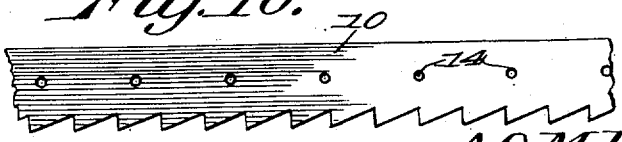
Inventor
A. O. M. Löfgren,
By Marks & Clerk
Attorney

UNITED STATES PATENT OFFICE.

ALBERT O. M. LÖFGREN, OF STOCKHOLM, SWEDEN, ASSIGNOR TO ARVID GUSTAF MICHAEL HERNMARCK, OF DJURSHOLM, SWEDEN, AND OSCAR ROBERT GRONKWIST, OF STOCKHOLM, SWEDEN.

PORTABLE SAWING MECHANISM.

15,294. Specification of Reissued Letters Patent. Reissued Feb. 28, 1922.

Original No. 1,303,809, dated May 13, 1919, Serial No. 265,464, filed December 5, 1918. Application for reissue filed December 5, 1921. Serial No. 520,153.

*To all whom it may concern:*

Be it known that I, ALBERT OLOF MELCHER LÖFGREN, a subject of the King of Sweden, residing at Stockholm, Sweden, have invented certain new and useful Improvements in Portable Sawing Mechanism, of which the following is a specification.

The present invention relates to a tree felling apparatus. Several different constructions of tree felling apparatus already exist but of these there is none, however, that has hitherto been applied in practice in any wide degree, owing to the fact that the saw used in the same is in the form of a chain, which, as is easily understood, is rather weak and besides very expensive. In consequence of the lack of durability, great loss of time is frequently caused if necessary repairs are to be made or a new chain is to be inserted at the place where the work is carried on. In any case, a chain, in consequence of the great strain on the many weak links, is rather soon worn out, and then a new chain must be inserted.

The present invention has for its object to remedy the said disadvantages. This object is attained by a band-saw arranged in a frame which, as in some other constructions, is made to stretch the band-saw and which is provided with deviating rollers, over which the band-saw travels. In order, however, that a frame provided with a band-saw may be advantageous in use, it has been necessary to arrange the band-saw blade in another way than that in which the saw chains have been arranged as will be further described below.

A tree-felling apparatus constructed in accordance with the present invention is shown in the accompanying drawings in which:

Figure 1 is a plan and Figure 2 a side view of the same in the position which it assumes in felling a tree.

Fig. 3 is a section on the line 3—3 in Fig. 1.

Figs. 4 and 5 show the driving device for the saw, in plan and side views.

Fig. 6 shows a detail.

Fig. 7 shows a frame adapted to support the apparatus in sawing through the trunk of a standing tree.

Figs. 8 and 9 show a device in the apparatus, viewed from the side and end, and intended to be used in cutting the trunk of a tree after it has been felled.

Fig. 10 shows a part of the saw-band.

In the form of apparatus shown in the drawings, the saw frame is triangular and formed of two rods 1 and 2, which preferably consist of light steel tubes, and each of which at either end is provided with an extension constructed of plates, as a casing or cover for a disk, serving as a deviating roller, over which the band-saw blade runs, and the shaft of which is carried by the said plates. The shaft 3 of the roller 4, which is at the point of junction between the extensions of the rods 1 and 2, also serves as the pivot about which these rods may turn, so that their other ends, with the rollers 5 and 6, can be moved toward or away from one another. In order to adjust and keep the last-named rollers at the required distance from one another, there are on the plates which house the roller 4, projecting ears 7 and 8, of which the ears 7, serve as supports for one end of a bolt 9, the other threaded end of which enters into a nut arranged between the ears 8. By screwing the bolt 9 in one direction or the other, the distance between the rollers 5 and 6 is increased or diminished. Over the rollers 4, 5 and 6 is laid an endless band-saw blade 10, the length of which is adjusted to the length of the rods 1 and 2, and to the desired distance between the rollers 5 and 6. The saw-blade is set in motion by one of the rollers (in the drawing the roller 5), which is arranged as a driving roller, and the shaft 11 of this roller, Figs. 1, 4 and 5, is for that purpose acted upon by, for instance, a driving shaft 12 with the aid of a bevel gear inclosed in the cover or casing 13, which is mounted on the casing of the roller. In order to insure that the roller really may drive the blade without this latter being tightly stretched, the roller is on its circumference provided with a number of pins or the like, which enter into corresponding apertures 14 arranged in the blade or in recesses made in one or both edges of the same.

In order to set that part of the saw-blade, which is between the rollers 5 and 6 and which is intended to carry out the sawing, in a suitable position in relation to the saw frame, so that the sawing can be conveniently executed, there extends from the casing for each of the rollers 5, 6 a guide-arm 15, at the ends of which are arranged two guide-rollers 16, (Fig. 6) between which the saw-blade runs, and a supporting roller 17 mounted in the guide-arm engages the back edge of the saw-blade. The guide-rollers 16 are so placed that the portion of the blade between them and the place of contact of the blade with the adjacent roller 5 and 6 respectively is twisted about ⅛ of a turn, so that the saw frame, when the side surfaces of the blade in the gap between the guide arms 15 is in a horizontal plane, assumes approximately the position indicated in Fig. 2. For it is evident that, if there should be no device for the twisting of the saw blade, the saw frame would have to be set vertically, i. e. parallel to the tree trunk to be cut, in order that a horizontal cut through the tree might be obtained, which, however, would be impossible, as the trunk would prevent the saw frame being fed forward.

In place of the rollers 16, 17, there may be placed, if so desired, at the outer end of each of the two arms 15, a disk 33, Figs. 4 and 5, which, for example, may be of so-called "fiber," and which is simply provided with a slit suited to the saw blade and in such a position that the blade is turned by the slit to the same position as by the rollers 16.

In order that a saw-blade may be easily inserted in, and removed from the frame, the rods 1 and 2 are so placed in relation to the rollers 4, 5 and 6, that the blade runs freely at the outer side of each of the two rods (see Fig. 3), while at that part of the circumference of the rollers 4, 5 and 6, where the saw-blade is in contact with the same, there is in the casing for each of the rollers an opening or slot 18 (see Figs. 4 and 5) through which the blade can, on edge, be inserted in or taken out from its place. In the guide arms 15 there are also corresponding openings or slits for the insertion and removal of the blade. As a protection for the blade 10 running along the rods 1 and 2, as well as for protecting the hands, when sawing, or transporting the apparatus, the rods are provided with channels 19, Figs. 1, 2 and 3, placed along the rods. Each channel 19 may be at one of its edges hinged to the rod, and at its other edge provided with some fastening device (a sliding bolt or the like), so that the chamber formed between the channel and the rod can be opened and closed for the insertion and removal of saw-blades.

In exchanging saw-blades it frequently occurs that the blade which is inserted in place of the previous blade is of another length than the old one, in which case the distance between the rollers 5 and 6 must be adjusted, and this is effected with the aid of the bolt 9, but when altering the distance, the direction of the guide arms 15 obviously also must be adjusted. This is effected by forming the two guide arms integral with casings which partially surround the rollers 5 and 6, and these casings, together with the arms are rotatable around the shafts of the rollers. In order that each of the two arms 15, after it has been adjusted in the required direction, may be retained in that position, there is a locking device, which may consist of, for instance, a screw 20, the nut of which is mounted in one part of the casing and for which there is a circular slit 21 in the other part of the casing.

In felling a tree it is necessary to keep the ends of the guide arms 15, opposing one another, at a distance from the tree, so that when the saw passes through the latter, these arms do not come into contact with the tree. For attaining this purpose, that arm, which the saw, in sawing, strives to draw toward the tree, is provided with a pin 22, for which there is a guide, consisting of a frame 23 (Figs. 2 and 7) placed on the ground close to the tree, which may suitably consist of a bent U-iron, or angle iron, or the like, and which may be furnished with spikes 24 to be driven into the trunk, so that the frame lies steady. The frame is preferably provided with two arms 25, 26, so that a support is obtained for each of the guide arms 15, and one of said arms 26, if so desired, can be made adjustable to suit different distances between the rollers 5 and 6. One of the outer sides of the frame, preferably that on the arm 25, forms during the sawing, the guide along which the pin 22 runs and thus prevents the arm 15 from being drawn toward the tree.

In order to enable the apparatus to be used also for the cutting of felled trunks, there is a device, consisting of a holder 27, adapted to be placed on that arm 15, which is provided with the pin 22 and this holder carries an angle (Figs. 8 and 9) which is rotatable on a pivot 28 projecting from the holder. At the beginning of the sawing, the angle assumes the position indicated in Fig. 8 by full lines, the arm 29 of the angle then resting against the side of the trunk, receives support against a pin 30 mounted on the holder, so that the guide arm 15 cannot be drawn toward the trunk. As the saw penetrates into the trunk, the other arm 31 of the angle approaches the same, where-upon the angle, as the saw penetrates deeper into the trunk, begins to rotate around the pivot 28, and continues doing so until the other arm 31 of the angle comes in contact with the pin 32 intended for the latter and mounted on the holder, when further turning of the angle is rendered impossible, and if the trunk has not yet been sawed through, the arm 29 moves out of contact with the trunk and only the arm 31 rests against it.

Having now described my invention, what I claim as new and desire to secure by Letters Patent is:

1. A portable sawing mechanism comprising a pair of rods, roller housings on the ends of said rods, a pivot connecting a housing at one end of one rod to the housing at one end of the other rod, a roller mounted on said pivot, rollers mounted in the housings at the opposite ends of said rods, a flexible saw running over said rollers, and longitudinal housings pivoted on said rods, the saw running along said rods and through said housings.

2. A portable sawing mechanism comprising a pair of rods, roller housings on the ends of said rods, a pivot connecting a housing at one end of one rod to the housing at one end of the other rod, a roller mounted on said pivot, rollers mounted in the housings at the opposite ends of said rods, a flexible saw running over said rollers, and tubular extensions pivotally connected to the last mentioned housings for enclosing the ends of the run of the saw otherwise exposed.

3. A portable sawing mechanism comprising a pair of rods, roller housings on the ends of said rods, a pivot connecting a housing at one end of one rod to the housing at one end of the other rod, a roller mounted on said pivot, rollers mounted in the housings at the opposite ends of said rods, a flexible saw running over said rollers, tubular extensions pivotally connected to the last mentioned housings for enclosing the ends of the run of the saw otherwise exposed, and means for locking said tubular extensions in a determined position.

4. A portable sawing mechanism comprising a pair of rods, roller housings on the ends of said rods, a pivot connecting a housing at one end of one rod to the housing at one end of the other rod, a roller mounted on said pivot, rollers mounted in the housings at the opposite ends of said rods, a flexible saw running over said rollers, tubular extensions pivotally connected to the last mentioned housings of the rods for enclosing the run of the saw otherwise exposed, and means located in the tubular extensions for changing the plane of the run of the saw.

5. A portable sawing device comprising a frame and a saw traveling on said frame, means carried on said frame to engage the work and resist the tendency of the saw travel to move the frame bodily, said means comprising an angle bar pivoted to the frame, so arranged that one arm engages the work and as the saw enters the work the bar may oscillate on its pivot to engage the other arm thereof.

6. A portable sawing mechanism of the kind defined by claim 2 having means for changing the plane of the exposed run of the saw, whereby said rods may be supported in an inclined position relatively to the vertical while the exposed run of the saw is traveling in a horizontal plane.

7. A portable sawing mechanism of the kind defined by claim 2 in which the housings of the rods are provided with means to permit the saw to be detached from said housings.

8. A portable sawing mechanism of the kind defined by claim 2 in which the housings at the ends of the rods are provided with slots to permit the detachment of the saw from said housings.

9. A portable sawing mechanism of the kind defined by claim 2 in which the housings at the ends of the rods and said tubular extensions are provided with slots to permit the detachment of the saw from said housings and extensions.

10. A portable tree-felling machine including a substantially triangular manually supportable frame having a plurality of rods pivotally connected together, housings on said rods, a roller carried by the frame and mounted on the pivot connecting the rods, other rollers carried by said rods, a flexible saw movable over said rollers, said frame having a gap across which the exposed run of the saw extends, and means carried by the frame for changing the plane of the exposed run of the saw, whereby said frame may be held in an inclined position relatively to the vertical while the exposed run of the saw is traveling in a horizontal plane.

11. A portable sawing machine comprising a frame, rollers carried in the frame, pivots in the frame for the rollers, a flexible endless band saw passing over the rollers and propelled by one of the rollers, means whereby the saw may be kept taut as it is propelled, means for twisting the blade to change substantially but less than ninety degrees the plane of that part of the saw actually doing the cutting, and housings for the saw, said frame being free to be held at different angles relative to the vertical whereby a cut may be made through a tree while the frame is held in an inclined position.

12. A machine of the kind defined by claim 11 in which said housings cover the entire saw with the exception of that portion which is actually doing the cutting.

13. A machine of the kind defined by claim 11 in which the frame includes a plurality of rods, and the housings include channel members connected to said rods.

14. A machine of the kind defined by claim 11 in which the frame includes a plurality of rods, and the housings include channel-shaped members pivotally connected to said rods.

ALBERT O. M. LÖFGREN.

Witnesses:
CARL TH. SUNDHOLM,
R. TÖTTERMAN.